United States Patent
Horiguchi et al.

(10) Patent No.: US 10,466,525 B2
(45) Date of Patent: Nov. 5, 2019

(54) DISPLAY APPARATUS

(71) Applicant: SAKAI DISPLAY PRODUCTS CORPORATION, Sakai-shi, Osaka (JP)

(72) Inventors: Yuki Horiguchi, Sakai (JP); Kohhei Nanbu, Sakai (JP); Shigeyoshi Okazaki, Sakai (JP); Hiroki Azuma, Sakai (JP); Tomohiro Asamizu, Sakai (JP); Noriaki Miyoshi, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/856,594

(22) Filed: Dec. 28, 2017

(65) Prior Publication Data

US 2018/0120628 A1    May 3, 2018

Related U.S. Application Data

(63) Continuation of application No. PCT/JP2015/068915, filed on Jun. 30, 2015.

(51) Int. Cl.
  *G02F 1/1333* (2006.01)
  *G02F 1/1335* (2006.01)
  *F21V 8/00* (2006.01)

(52) U.S. Cl.
  CPC ....... *G02F 1/133512* (2013.01); *G02B 6/005* (2013.01); *G02B 6/0025* (2013.01);
  (Continued)

(58) Field of Classification Search
  CPC .............................................. G02F 1/133308
  (Continued)

(56) References Cited

U.S. PATENT DOCUMENTS

| | | | | |
|---|---|---|---|---|
| 5,739,880 | A * | 4/1998 | Suzuki | G02F 1/133512 349/110 |
| 2012/0026449 | A1 * | 2/2012 | Yang | G02F 1/1339 349/153 |

(Continued)

FOREIGN PATENT DOCUMENTS

| | | |
|---|---|---|
| JP | 2002-040394 A | 7/2000 |
| JP | 2005-084510 A | 3/2005 |

(Continued)

OTHER PUBLICATIONS

ISR issued in Int'l. App. No. PCT/JP2015/068915, dated Sep. 15, 2016.

(Continued)

*Primary Examiner* — Edmond C Lau
(74) *Attorney, Agent, or Firm* — Greer, Burns & Crain, Ltd.

(57) ABSTRACT

A display apparatus has a display panel having a display region, a light shielding region surrounding the display region, and an outer region located outside of the light shielding region; a support frame disposed at a rear surface side of the display panel, the support frame including a panel supporting portion which supports a peripheral portion of the display panel from a rear side, and an extension beginning from the panel supporting portion and extending away from the display panel; and a light shield disposed at the rear surface side of the display panel, the light shield including a light-shielding portion which is disposed between the display panel and the support frame, the light-shielding portion extending so as to overlap at least a portion of the light shielding region and the outer region of the display panel as viewed from a normal direction of the display panel, and a fixture portion beginning from the light-shield- (Continued)

ing portion and extending away from the display panel, the fixture portion being fixed to the extension of the support frame.

15 Claims, 3 Drawing Sheets

(52) U.S. Cl.
CPC ............... *G02F 1/133602* (2013.01); *G02F 2001/133317* (2013.01); *G02F 2001/133388* (2013.01); *G02F 2201/465* (2013.01); *G02F 2202/28* (2013.01)

(58) Field of Classification Search
USPC .......................................................... 349/58
See application file for complete search history.

(56) References Cited

U.S. PATENT DOCUMENTS

| 2012/0063167 A1* | 3/2012 | Ozawa | G02B 6/0031 362/609 |
| 2015/0153609 A1 | 6/2015 | Kim | |
| 2015/0177548 A1* | 6/2015 | Jeon | G02F 1/133308 349/12 |
| 2015/0192822 A1* | 7/2015 | Katou | G02F 1/133308 349/58 |
| 2015/0277185 A1* | 10/2015 | Nam | G02F 1/133512 349/58 |

FOREIGN PATENT DOCUMENTS

| JP | 2013-225033 A | 10/2013 |
| JP | 2014-021295 A | 2/2014 |
| JP | 2015-026065 A | 2/2015 |
| JP | 2015-108806 A | 6/2015 |

* cited by examiner

DISPLAY APPARATUS

This is a continuation of International Application No. PCT/JP2015/068915, with an international filing date of Jun. 30, 2015, the entire contents of which are hereby incorporated by reference.

BACKGROUND OF THE INVENTION

1. Field of the Invention

The present invention relates to a display apparatus that displays images.

2. Description of the Related Art

A display apparatus having a liquid crystal panel on which to display an image includes the liquid crystal panel and a backlight device which is provided at the rear surface side of the liquid crystal panel. Light which has exited from the backlight device is modulated by the liquid crystal panel as it is transmitted therethrough, whereby an image is displayed by the display apparatus.

The liquid crystal panel has a light shielding region in the shape of a frame formed along its periphery, and a display region inside the light shielding region, the display region being capable of displaying an image. The light shielding region is defined by a light-shield strip which is provided within the liquid crystal panel. The light-shield strip intercepts light which is radiated from the backlight device toward the liquid crystal panel. This prevents the surroundings of the display region from appearing brighter than the display region due to so-called leakage of light. Backlight devices are generally classified into the direct type and the edge light type; however, regardless of such types, a backlight device includes a backlight chassis, which is a shallow box having an opening, and a light source disposed in the backlight chassis.

Moreover, the display apparatus includes a panel chassis of a frame shape, such that the panel chassis supports the peripheral portion of the liquid crystal panel from the rear side. As the panel chassis, that of white color is used in order to enhance the efficiency of light utility from the backlight device through reflection. From the inner periphery of the panel chassis, a thin-profiled protrusion projects inward along its entire circumference. An optical sheet is provided on one surface of this protrusion that is closer to the liquid crystal panel. The optical sheet faces the liquid crystal panel, with its peripheral portion being supported by the protrusion. The optical sheet attains convergence, diffusion, and the like of the light from the backlight device.

Furthermore, the display apparatus includes a frame-shaped bezel which is provided at the front side (viewer's side) of the liquid crystal panel. The bezel and the panel chassis sandwich the peripheral portion of the liquid crystal panel. The bezel is disposed so that it overlaps the light shielding region on the front side of the liquid crystal panel. This prevents light from the backlight device from passing through a portion that is located outside of the light-shield strip of the liquid crystal panel so as to leak out through the front side of the liquid crystal panel.

On the other hand, a so-called narrow frame construction has been adopted for display apparatuses, this being in order to enlarge the display region (see, for example, Japanese Laid-Open Patent Publication No. 2002-40394).

However, adopting a narrow frame construction for a liquid crystal panel may reduce the region in which the bezel overlaps the light-shield strip. In this case, in a direct-type backlight device, a portion of light from the backlight device may be guided inside the optical sheet until it leaks out at an end surface of the optical sheet. Light leaking out of the optical sheet may reflect from the panel chassis so as to enter the liquid crystal panel outside of the light-shield strip, and be guided therethrough, eventually exiting from the liquid crystal panel without being intercepted by the bezel, thus resulting in leakage of light. In the case of a backlight of the edge light type, where the panel chassis is located directly above the light source, light may be transmitted through the panel chassis and enter the liquid crystal panel outside of the light-shield strip, thus resulting in leakage of light. The display quality of a display apparatus is deteriorated when leakage of light occurs.

SUMMARY OF THE INVENTION

The present invention has been made in view of the above circumstances, and an objective thereof is to provide a display apparatus which can prevent deteriorations in display quality due to leakage of light.

A display apparatus according to an embodiment of the present invention comprises: a display panel having a display region in which to display an image, a light shielding region surrounding the display region, and an outer region located outside of the light shielding region; a support frame disposed at a rear surface side of the display panel, the support frame including a panel supporting portion which supports a peripheral portion of the display panel from a rear side, and an extension beginning from the panel supporting portion and extending away from the display panel; and a light shield disposed at the rear surface side of the display panel, the light shield including a light-shielding portion which is disposed between the display panel and the support frame, the light-shielding portion extending so as to overlap at least a portion of the light shielding region and the outer region of the display panel as viewed from a normal direction of the display panel, and a fixture portion beginning from the light-shielding portion and extending away from the display panel, the fixture portion being fixed to the extension of the support frame, wherein, the fixture portion of the light shield has at least one aperture; and the extension of the support frame includes at least one hook portion which is insertable in the at least one aperture to fix the fixture portion at a predetermined position relative to the extension.

A display apparatus according to an embodiment of the present invention comprises: a display panel having a display region in which to display an image, a light shielding region surrounding the display region, and an outer region located outside of the light shielding region; a backlight section disposed at a rear surface side of the display panel; an optical sheet disposed between the backlight section and the display panel so as to overlap at least the display region of the display panel as viewed from a normal direction of the display panel; a support frame disposed at the rear surface side of the display panel, the support frame including a panel supporting portion which supports a peripheral portion of the display panel from a rear side, a sheet supporting portion which projects inward from the support frame to support a peripheral portion of the optical sheet from a rear side, and an extension beginning from the panel supporting portion and extending away from the display panel; and a light shield disposed at the rear surface side of the display panel, the light shield including a light-shielding portion which is disposed between the display panel and the support frame and optical sheet, the light-shielding portion extending so as to overlap at least a portion of the light shielding region and the outer region of the display panel as viewed from the normal direction of the display panel, and a fixture portion beginning from the light-shielding portion and extending away from the display panel, the fixture portion being fixed to the extension of the support frame, wherein, the optical sheet is at an interspace from the panel supporting portion of the support frame, the interspace overlapping the light-shielding portion as viewed from the normal direction of the display panel.

In one embodiment, the fixture portion is adhesively bonded to the extension.

In one embodiment, the light shield comprises an elastic member.

In one embodiment, the fixture portion of the light shield has at least one aperture; and the extension of the support frame includes at least one hook portion which is insertable in the at least one aperture to fix the fixture portion at a predetermined position relative to the extension.

In one embodiment, the display apparatus further comprises a diffuser disposed between the backlight section and the optical sheet, wherein the sheet supporting portion of the support frame is located between the diffuser and the optical sheet.

In one embodiment, the backlight section is an edge light type backlight section including a light guide plate and a light source which causes light to be incident on a side surface of the light guide plate; and the light shield is disposed so as to overlap the entire light source as viewed from the normal direction of the display panel.

In one embodiment, the fixture portion includes a plurality of portions that are disposed at intervals along a peripheral direction.

In one embodiment, the light shield is black in color.

A display apparatus according to an embodiment of the present invention includes: a display panel having a light shielding region of a frame shape formed along a periphery thereof and being capable of displaying an image inside the light shielding region; a support frame which supports a peripheral portion of the display panel from a rear side; and a light shield disposed between the display panel and the support frame, the light shield covering a region including a portion of a supporting surface (rear surface) of the display panel that is located outside of the light shielding region.

According to an embodiment of the present invention, the light shield covers a region including a portion of the supporting surface (rear surface) of the display panel that is located outside of the light shielding region, so that light is intercepted by the portion located outside of the light shielding region. Therefore, when the liquid crystal panel is irradiated with light from a backlight device, leakage of light does not occur, whereby display quality of the display apparatus is conserved. By composing the light shield from an elastic member, the display panel is allowed to function as a spacer for protection against vibration, impacts, etc.

In a display apparatus according to an embodiment of the present invention, the support frame includes an extension extending away from the display panel, and the light shield includes a fixture portion beginning from the outer periphery and extending away from the display panel, the fixture portion being fixed to the extension.

In one embodiment, the light shield is fixed, at its fixture portion, to the extension of the support frame. As a result, the light shield is restrained from moving under the influences of contraction and expansion associated with temperature changes and protruding partially inside of the light shielding region.

In one embodiment, a plurality of fixture portions are provided at predetermined intervals along the peripheral direction. As a result, when component parts such as SOFs (system on film) exist in a manner of projecting from the display panel, overlap between any such component parts and the fixture portions is prevented. As a result, the display apparatus maintains a narrow frame.

In one embodiment, the fixture portion is adhesively bonded to the extension. As a result, the light shield can be easily fixed via adhesion by using an adhesive agent, a double sided tape, or like members.

In one embodiment, the fixture portion has an engagement aperture, and the extension includes an engaging tab to engage with the engagement aperture. As a result, without using any member such as an adhesive agent or a double sided tape, the light shield can be fixed to the support frame. Therefore, a difference in thermal expansion between any such member and the light shield is not likely to cause creases in the light shield, whereby the light shield is better restrained from protruding into the display region.

In one embodiment, the light shield is black in color. As a result, intercepting of light is attained more effectively than by using any other color.

According to the present invention, deteriorations in display quality due to leakage of light can be prevented.

DETAILED DESCRIPTION OF PREFERRED EMBODIMENTS

Embodiment 1

Figure 1:
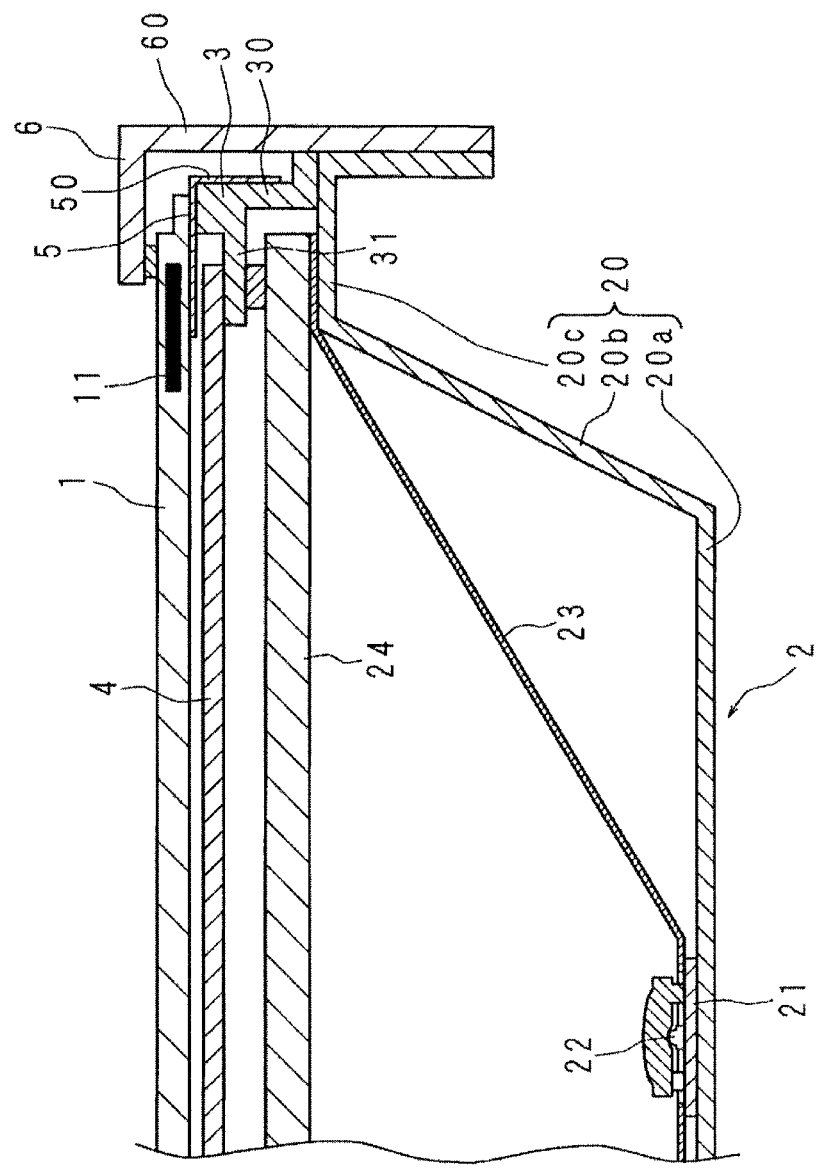
FIG. 1 is a cross-sectional view showing an essential portion of a display apparatus according to Embodiment 1.

Hereinafter, embodiments of the present invention will be described in detail, with reference to the drawings. FIG. 1 is a cross-sectional view showing the construction of an essential portion of a display apparatus according to Embodiment 1. The display apparatus shown in FIG. 1 includes a liquid crystal panel 1 of a rectangular shape which displays an image on the frontal surface (viewer's side), and a direct-type backlight device 2 which is provided at the rear surface side of the liquid crystal panel 1.

The backlight device 2 includes a backlight chassis 20, a plurality of substrates 21, and a plurality of LEDs 22. Note that only one of the substrates 21 and one of the LEDs are shown in FIG. 1. The backlight chassis 20 is a shallow box having a bottom plate 20a of a rectangular shape and side plates 20b respectively rising from the four sides of the bottom plate 20a, which together define an opening that corresponds to an entire surface opposite from the bottom plate 20a. At the edge of the side plates 20b surrounding the opening, flanges 20c that protrude outward are provided. The substrates 21 are provided on the bottom plate 20a, with each LED 22 being mounted on one surface of a corresponding substrate 21 so as to face toward the opening.

On the inside, the backlight chassis 20 is covered with a reflection sheet 23. The reflection sheet 23 includes a base portion having a rectangular shape, side portions rising from the four sides of the base portion, and flanges protruding outward from the side portions in a direction parallel to the base portion. In the base portion of the reflection sheet 23, apertures are made at positions respectively corresponding to the LEDs 22. The base portion of the reflection sheet 23 is placed upon the bottom plate 20a of the backlight chassis 20, such that each LED 22 is exposed through a corresponding aperture in the base portion toward the opening of the backlight chassis 20. The flanges of the reflection sheet 23 are overlaid on the flanges 20c of the backlight chassis 20. Inside the backlight chassis 20, the base portion and the side portions of the reflection sheet 23 cover over the bottom plate 20a and the side plates 20b.

Via the reflection sheet 23, a diffuser 24 is disposed on the flanges 20c of the backlight chassis 20. The diffuser 24 is disposed so as to cover over the opening of the backlight chassis 20 across its entire surface, such that the peripheral portion of the diffuser 24 is supported by the flanges 20c.

Also on the flanges 20c, a panel chassis 3 is provided that includes a panel supporting portion which supports the liquid crystal panel 1 from the rear side. Thus, the panel chassis 3 supports the liquid crystal panel 1 from the rear side. The panel chassis 3 has a frame shape, and is made of a white resin. The panel chassis 3 includes an extension 30 of a frame shape, the extension 30 beginning from the outer periphery and extending away from the liquid crystal panel. From the inner periphery of the panel chassis 3, a thin-profiled protrusion 31 projects inward along its entire circumference. Via spacers, the protrusion 31 and the flanges 20c sandwich the reflection sheet 23 and the diffuser 24. Moreover, an optical sheet 4 is provided on one surface of the protrusion (also referred to as a "sheet supporting portion") 31 that is closer to the liquid crystal panel 1, such that the peripheral portion of the optical sheet 4 is supported from the rear side.

Between the liquid crystal panel 1 and the panel chassis 3, a light shield 5 is provided that is in the form of a frame-shaped sheet extending along the four sides of the panel chassis 3. The light shield 5, which may be black in color, is made of a resin such as PET (Polyethylene terephthalate). The light shield 5 includes fixture portions 50 beginning from the outer periphery and extending away from the liquid crystal panel 1, the fixture portions 50 being fixed to the extension 30. Specifically, for example, the fixture portions 50 are adhesively bonded to the outside of the extension 30 of the panel chassis 3 with a double sided tape. Use of a double sided tape allows the light shield 5 to be attached easily. The liquid crystal panel 1 is disposed on the panel chassis 3 with the light shield 5 interposed therebetween.

The bezel 6 includes side plate portions 60 which, while rising perpendicularly from the outer periphery toward the rear side, together define a rectangular frame shape. Via spacers, the bezel 6 and the panel chassis 3 sandwich the liquid crystal panel 1. The side plate portions 60 extend alongside the extension 30 of the panel chassis 3.

Figure 2:
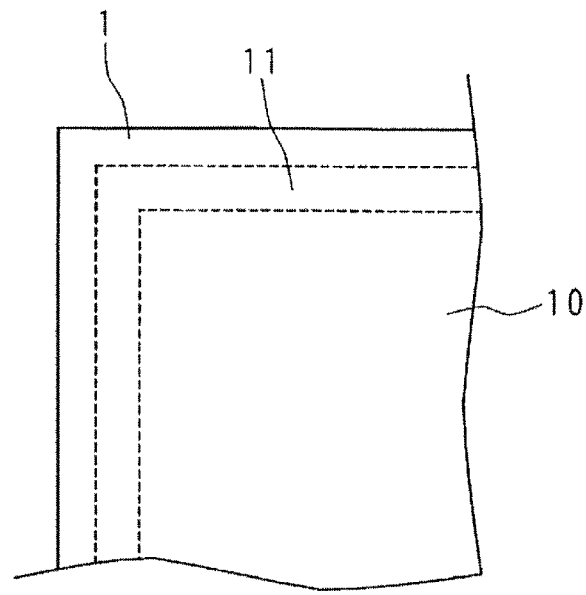
FIG. 2 is a plan view showing a display region of a liquid crystal panel.

FIG. 2 is a plan view showing a display region of the liquid crystal panel 1. At certain distances from the periphery, a display region 10 and a light-shield strip 11 are provided in the liquid crystal panel 1, the light-shield strip 11 having a frame shape that surrounds the display region 10 and extending alongside the periphery of the liquid crystal panel 1. The light-shield strip 11 constitutes a light shielding region that intercepts light from the backlight device 2. Note that the light-shield strip 11 may be a portion of a black matrix. In the liquid crystal panel 1, the region located outside of the light shielding region will be referred to as an "outer region". As shown in FIG. 1, at the rear side of the liquid crystal panel 1, as viewed from the normal direction of the liquid crystal panel 1, the light shield 5 overlaps at least a portion of the light-shield strip 11 (light shielding region) and the outer region. In other words, the light shield 5 covers the rear surface of the liquid crystal panel 1, including the outer region located outside of the light-shield strip 11 (light shielding region).

Figure 3:
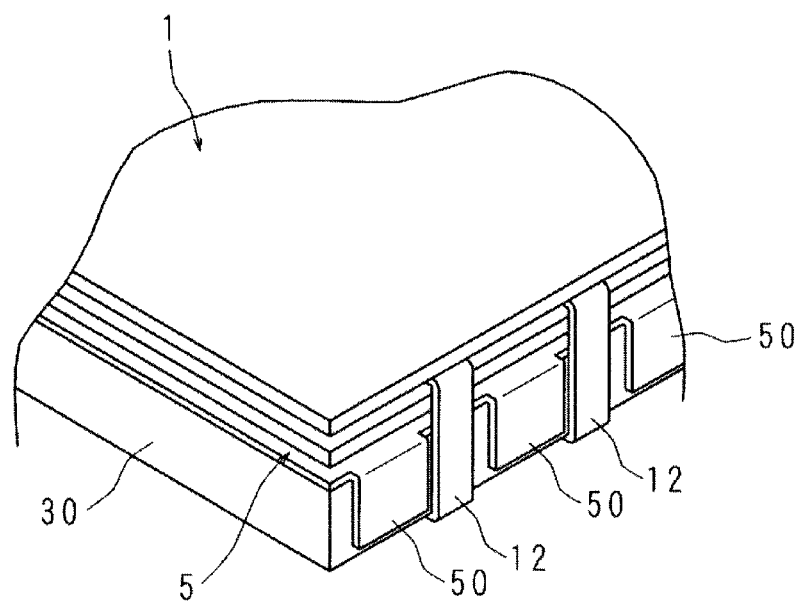
FIG. 3 is a schematic diagram showing positioning of fixture portions of a light shield.

FIG. 3 is a schematic diagram showing positioning of the fixture portions 50 of the light shield 5. A plurality of SOFs (System On Film) 12 are provided at predetermined intervals, these SOFs projecting from a side surface of the liquid crystal panel 1. Each SOF 12 includes a driver which drives display pixels and switching elements. The fixture portions 50 of the light shield 5 are provided at predetermined intervals so as to avoid overlapping with the SOFs 12, and are adhesively bonded to the extension 30 of panel chassis 3 with a double sided tape.

In a display apparatus with the above construction, light exiting from each LED 22 is diffused and converged by the diffuser 24 and the optical sheet 4, respectively, and irradiates the rear surface of the liquid crystal panel 1. By modulating this light, the liquid crystal panel 1 displays an image on its frontal surface.

In some cases, light which has entered the optical sheet 4 may leak from an end surface of the optical sheet 4 into the interspace between the optical sheet 4 and the panel chassis 3, and be reflected by the panel chassis 3 so as to travel toward the liquid crystal panel 1. In these cases, even if any light travels outside the light-shield strip 11 of the liquid crystal panel 1 (i.e., in the outer region of the liquid crystal panel 1), the light is intercepted by the light shield 5.

With the above construction, the light shield 5 covers the rear surface of the liquid crystal panel 1 in a region including portions (outer region) located outside of the light-shield strip 11. Therefore, light is not transmitted through the liquid crystal panel 1 in the outer region, whereby leakage of light in the display apparatus is suppressed. Thus, display quality of the display apparatus is conserved.

Since the fixture portions 50 of the light shield 5 are provided at predetermined intervals so as to avoid the SOFs 12, the display apparatus maintains a narrow frame. Since light shield 5 is black, intercepting of light is attained more effectively than by using any other color.

Furthermore, by composing the light shield 5 from an elastic member, it is allowed to function as a spacer which protects the liquid crystal panel 1 from vibration, impacts, etc. Moreover, the fixture portions 50 of the light shield 5 are adhesively bonded to the extension 30 of the panel chassis 3. As a result, the light shield 5 is restrained from moving under the influences of contraction and expansion associated with temperature changes and protruding partially into the display region 10.

Embodiment 2

Figure 4:
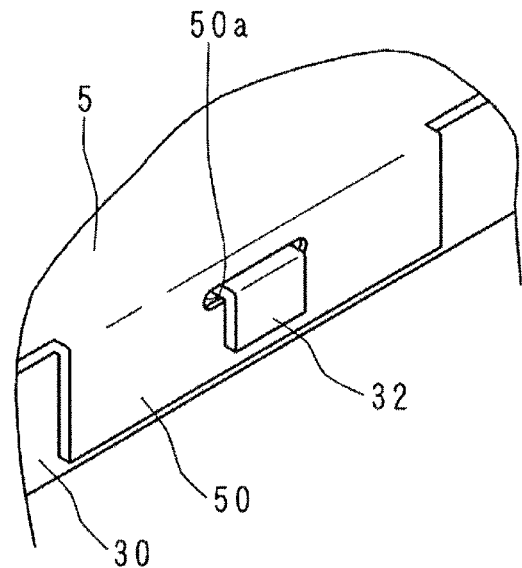
FIG. 4 is a schematic diagram showing the construction of an essential portion of a display apparatus according to Embodiment 2.

A display apparatus according to Embodiment 2 differs from Embodiment 1 with respect to the structure by which the light shield 5 is fixed. FIG. 4 is a schematic diagram showing the construction of an essential portion of the display apparatus according to Embodiment 2. FIG. 4 corresponds to FIG. 3, which is associated with Embodiment 1. Those constituent elements of the display apparatus according to Embodiment 2 which have similar counterparts in Embodiment will be denoted by like numerals, and the detailed description thereof will be omitted.

In Embodiment 2, an engagement aperture (which may simply be referred to as an "aperture") 50a is made in each fixture portion 50 of the light shield 5. Moreover, engaging tabs of hook shapes (hook portions) 32 are provided on the extension 30 of the panel chassis 3. The engaging tabs 32 on the extension 30 are inserted in and engaged with the engagement apertures 50a of the fixture portions 50. As a result, the light shield 5 becomes caught by the panel chassis 3, whereby the light shield 5 can be easily positioned with respect to the panel chassis 3, and fixed thereto.

Moreover, without using any member such as an adhesive agent or a double sided tape, the light shield 5 can be fixed to the panel chassis 3. Therefore, a difference in thermal expansion between any such member and the light shield 5 is not likely to cause creases in the light shield 5, whereby the light shield 5 is better restrained from protruding into the display region 10.

Embodiment 3

Figure 5:
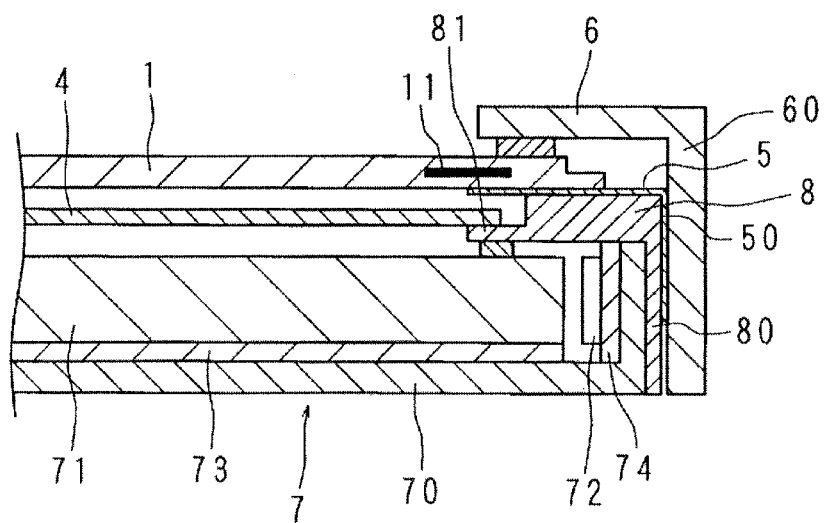
FIG. 5 is a cross-sectional view showing the construction of an essential portion of a display apparatus according to Embodiment 3.

A display apparatus according to Embodiment 3 includes a backlight device of the edge light type. FIG. 5 is a cross-sectional view showing the construction of an essential portion of the display apparatus according to Embodiment 3. Those constituent elements of the display apparatus according to Embodiment 3 which have similar counterparts in Embodiment will be denoted by like numerals, and the detailed description thereof will be omitted.

Similarly to Embodiment 1, the display apparatus according to Embodiment 3 includes a liquid crystal panel 1, an optical sheet 4, a light shield 5, and a bezel 6. The display apparatus further includes a backlight device 7 of the edge light type that is provided at the rear surface side of the liquid crystal panel 1, and a panel chassis 8 made of a white resin.

The backlight device 7 includes a backlight chassis 70, a light guide plate 71, and a plurality of LEDs 72. The backlight chassis 70 has a bottom plate of a rectangular shape and side plates respectively rising perpendicularly from the four sides of the bottom plate, which together define a shallow box shape having one open surface.

The light guide plate 71 is a flat plate of a rectangular shape that is made of glass or a light-transmissive resin material, and is placed on the bottom plate of the backlight chassis 70 via the reflection sheet 73. The upper surface of the light guide plate 71 faces the opening of the backlight chassis 70.

The LEDs 72 are mounted on a substrate 74 which is attached on a side plate of the backlight chassis 70. The LEDs 72 face a side surface of the light guide plate 71. Note that FIG. 5 shows only one of the LEDs.

The panel chassis 8 includes an extension 80 of a rectangular frame shape, the extension 80 beginning from the outer periphery and extending away from the liquid crystal panel 1. The extension 80 of the panel chassis 8 covers the side plate of the backlight chassis 70 on the outside. Moreover, the panel chassis 8 supports the liquid crystal panel 1 from the rear side. Via spacers, the panel chassis 8 and the bottom plate of the backlight chassis 70 sandwich the peripheral portion of the light guide plate 71. From the inner periphery of the panel chassis 8, a thin-profiled protrusion 81 projects inward along its entire circumference.

Between the liquid crystal panel 1 and the panel chassis 8, a light shield 5 of a frame shape is provided. The light shield 5 covers the peripheral portion of the rear surface of the liquid crystal panel 1. As shown in FIG. 5, at the rear surface of the liquid crystal panel 1, the light shield 5 overlaps at least a portion of the light-shield strip 11. In other words, the light shield 5 covers the rear surface of the liquid crystal panel 1, including the portion located outside of the light-shield strip 11. The fixture portions 50 of the light shield 5 are adhesively bonded to the extension 80 of the panel chassis 8 with a double sided tape.

Alternatively, an engagement aperture may be made in each fixture portion 50 of the light shield 5, and engaging tabs to be inserted in the engagement apertures may be provided on the extension 80 of the panel chassis 8; thus, by allowing the engaging tabs to be inserted in and engaged with the engagement apertures, the light shield 5 may be fixed on the panel chassis 8.

The bezel 6 and the panel chassis 8 sandwich the peripheral portion of the liquid crystal panel 1. Side plate portions 60 of the bezel 6 cover the extension 80 of the panel chassis 8 on the outside. Moreover, the optical sheet 4 is disposed on one surface of the protrusion 81 of the panel chassis 8 that is closer to the liquid crystal panel 1, such that the peripheral portion of the optical sheet 4 is supported from the rear side.

In the display apparatus having the above-described construction, light exiting from each LED 72 and entering the light guide plate 71 at one side surface thereof keeps traveling inside the light guide plate 71 while repeatedly undergoing reflection by the reflection sheet 73 and reflection by the upper surface of the light guide plate 71, until it exits from the entire upper surface of the light guide plate 71. Light exiting from the light guide plate 71 is diffused and converged by the optical sheet 4, and irradiates the rear surface of the liquid crystal panel 1. The liquid crystal panel 1 modulates the incident light as it is transmitted therethrough, thus displaying an image on the frontal surface.

In some cases, a portion of outgoing light from the LEDs 72 may be transmitted through the panel chassis 8 and travel toward the liquid crystal panel 1. In these cases, too, the light is intercepted by the light shield 5 or the light-shield strip 11 because the peripheral portion of the rear surface of the liquid crystal panel 1 is covered by the light shield 5.

In the above construction, regarding the rear surface of the liquid crystal panel 1, the light shield 5 covers a region including portions located outside of the light-shield strip 11; therefore, light from the backlight device 7 is not transmitted through any portions located outside of the light-shield strip 11, so that leakage of light in the display apparatus is suppressed. Thus, display quality of the display apparatus is conserved.

Furthermore, since the light shield 5 is fixed to the extension 80 of the panel chassis 8, the light shield 5 is restrained from moving to protrude partially into the display region of the liquid crystal panel 1, under the influences of contraction and expansion associated with temperature changes. Moreover, by composing the light shield 5 from an elastic member, it is allowed to function as a spacer which protects the liquid crystal panel 1 from vibration, impacts, etc.

In all aspects, the embodiments disclosed herein are to be considered illustrative rather than restrictive. Rather than the aforementioned, it is intended that the scope of the present invention is expressed by the claims, and encompasses any and all modifications within the scope of the claims and the equivalents thereof. In other words, the technological scope of the present invention encompasses any embodiment that may result from combining technological means as appropriately modified within the scope of the claims.

What is claimed is:

1. A display apparatus comprising:
a display panel having a display region in which to display an image, a light shielding region surrounding the display region, and an outer region located outside of the light shielding region;
an optical sheet disposed at a rear surface side of the display panel so as to overlap at least the display region of the display panel as viewed from a normal direction of the display panel;
a support frame disposed at a rear surface side of the display panel, the support frame including
a panel supporting portion which supports a peripheral portion of the display panel from a rear side,
a sheet supporting portion which projects inward from the support frame to support a peripheral portion of the optical sheet from a rear side, the sheet supporting portion being located inside of the panel supporting portion, and
an extension beginning from the panel supporting portion and extending away from the display panel; and
a light shield disposed at the rear surface side of the display panel, the light shield including
a light-shielding portion which is disposed between the display panel and the support frame, the light-shielding portion extending so as to overlap at least a portion of the light shielding region and the outer region of the display panel as viewed from the normal direction of the display panel, and
a fixture portion beginning from the light-shielding portion and extending away from the display panel, the fixture portion being fixed to the extension of the support frame, wherein,
as viewed from the normal direction of the display panel, an end surface of the optical sheet is located inside of the panel supporting portion and the extension,
the fixture portion of the light shield has at least one aperture; and
the extension of the support frame includes at least one hook portion which is insertable in the at least one aperture to fix the fixture portion at a predetermined position relative to the extension.

2. A display apparatus comprising:
a display panel having a display region in which to display an image, a light shielding region surrounding the display region, and an outer region located outside of the light shielding region;
a backlight section disposed at a rear surface side of the display panel;
an optical sheet disposed between the backlight section and the display panel so as to overlap at least the display region of the display panel as viewed from a normal direction of the display panel;
a support frame disposed at the rear surface side of the display panel, the support frame including
a panel supporting portion which supports a peripheral portion of the display panel from a rear side,
a sheet supporting portion which projects inward from the support frame to support a peripheral portion of the optical sheet from a rear side, the sheet supporting portion being located inside of the panel supporting portion, and
an extension beginning from the panel supporting portion and extending away from the display panel; and
a light shield disposed at the rear surface side of the display panel, the light shield including
a light-shielding portion which is disposed between the display panel and the support frame and optical sheet, the light-shielding portion extending so as to overlap at least a portion of the light shielding region and the outer region of the display panel as viewed from the normal direction of the display panel, and
a fixture portion beginning from the light-shielding portion and, on an outside of the extension, extending away from the display panel, the fixture portion being fixed to the extension of the support frame, wherein,
as viewed from the normal direction of the display panel, an end surface of the optical sheet is located inside of the panel supporting portion and the extension, the end surface of the optical sheet being located at an interspace from the panel supporting portion of the support frame, the interspace overlapping the light-shielding portion as viewed from the normal direction of the display panel.

3. The display apparatus of claim 1, wherein the fixture portion includes a plurality of portions that are disposed at intervals along a peripheral direction.

4. The display apparatus of claim 2, wherein,
the backlight section is an edge light type backlight section including a light guide plate and a light source which causes light to be incident on a side surface of the light guide plate; and
the light shield is disposed so as to overlap the entire light source as viewed from the normal direction of the display panel.

5. The display apparatus of claim 2, wherein the fixture portion is adhesively bonded directly to an outer side surface of the extension.

6. The display apparatus of claim 2, wherein the light shield comprises an elastic member.

7. The display apparatus of claim 2, wherein,
the fixture portion of the light shield has at least one aperture; and
the extension of the support frame includes at least one hook portion which is insertable in the at least one aperture to fix the fixture portion at a predetermined position relative to the extension.

8. The display apparatus of claim 2, further comprising a diffuser disposed between the backlight section and the optical sheet, wherein
the sheet supporting portion of the support frame is located between the diffuser and the optical sheet.

9. The display apparatus of claim 1, wherein the light shield is black in color.

10. The display apparatus of claim 2, wherein the fixture portion includes a plurality of portions that are disposed at intervals along a peripheral direction.

11. The display apparatus of claim 2, wherein the light shield is black in color.

12. The display apparatus of claim 2, wherein, the fixture portion is fixed directly to an outer side surface of the extension of the support frame.

13. A display apparatus comprising:
a display panel having a display region in which to display an image, a light shielding region surrounding the display region, and an outer region located outside of the light shielding region;

a backlight section disposed at a rear surface side of the display panel;

an optical sheet disposed between the backlight section and the display panel so as to overlap at least the display region of the display panel as viewed from a normal direction of the display panel;

a support frame disposed at the rear surface side of the display panel, the support frame including
a panel supporting portion which supports a peripheral portion of the display panel from a rear side,
a sheet supporting portion which projects inward from the support frame to support a peripheral portion of the optical sheet from a rear side, the sheet supporting portion being located inside of the panel supporting portion, and
an extension beginning from the panel supporting portion and extending away from the display panel; and a light shield disposed at the rear surface side of the display panel, the light shield including
a light-shielding portion which is disposed between the display panel and the support frame and optical sheet, the light-shielding portion extending so as to overlap at least a portion of the light shielding region and the outer region of the display panel as viewed from the normal direction of the display panel, and
a fixture portion beginning from the light-shielding portion and extending away from the display panel, the fixture portion being fixed to the extension of the support frame, wherein, as viewed from the normal direction of the display panel, an end surface of the optical sheet is located inside of the panel supporting portion and the extension, the end surface of the optical sheet being located at an interspace from the panel supporting portion of the support frame, the interspace overlapping the light-shielding portion as viewed from the normal direction of the display panel, and wherein the fixture portion of the light shield has at least one aperture, and the extension of the support frame includes at least one hook portion which is insertable in the at least one aperture to fix the fixture portion at a predetermined position relative to the extension.

14. A display apparatus comprising:

a display panel having a display region in which to display an image, a light shielding region surrounding the display region, and an outer region located outside of the light shielding region;

a backlight section disposed at a rear surface side of the display panel;

an optical sheet disposed between the backlight section and the display panel so as to overlap at least the display region of the display panel as viewed from a normal direction of the display panel;

a support frame disposed at the rear surface side of the display panel, the support frame including
a panel supporting portion which supports a peripheral portion of the display panel from a rear side,
a sheet supporting portion which projects inward from the support frame to support a peripheral portion of the optical sheet from a rear side, the sheet supporting portion being located inside of the panel supporting portion, and
an extension beginning from the panel supporting portion and extending away from the display panel; and a light shield disposed at the rear surface side of the display panel, the light shield including
a light-shielding portion which is disposed between the display panel and the support frame and optical sheet, the light-shielding portion extending so as to overlap at least a portion of the light shielding region and the outer region of the display panel as viewed from the normal direction of the display panel,
a fixture portion beginning from the light-shielding portion and extending away from the display panel, the fixture portion being fixed to the extension of the support frame; and a diffuser disposed between the backlight section and the optical sheet, wherein, as viewed from the normal direction of the display panel, an end surface of the optical sheet is located inside of the panel supporting portion and the extension, the end surface of the optical sheet being located at an interspace from the panel supporting portion of the support frame, the interspace overlapping the light-shielding portion as viewed from the normal direction of the display panel, and wherein the sheet supporting portion of the support frame is located between the diffuser and the optical sheet.

15. A display apparatus comprising:

a display panel having a display region in which to display an image, a light shielding region surrounding the display region, and an outer region located outside of the light shielding region;

a backlight section disposed at a rear surface side of the display panel;

an optical sheet disposed between the backlight section and the display panel so as to overlap at least the display region of the display panel as viewed from a normal direction of the display panel;

a support frame disposed at the rear surface side of the display panel, the support frame including
a panel supporting portion which supports a peripheral portion of the display panel from a rear side,
a sheet supporting portion which projects inward from the support frame to support a peripheral portion of the optical sheet from a rear side, the sheet supporting portion being located inside of the panel supporting portion, and
an extension beginning from the panel supporting portion and extending away from the display panel; and a light shield disposed at the rear surface side of the display panel, the light shield including
a light-shielding portion which is disposed between the display panel and the support frame and optical sheet, the light-shielding portion extending so as to overlap at least a portion of the light shielding region and the outer region of the display panel as viewed from the normal direction of the display panel, and
a fixture portion beginning from the light-shielding portion and extending away from the display panel, the fixture portion being fixed to the extension of the support frame, wherein, as viewed from the normal direction of the display panel, an end surface of the optical sheet is located inside of the panel supporting portion and the extension, the end surface of the optical sheet being located at an interspace from the panel supporting portion of the support frame the interspace overlapping the light-shielding portion as viewed from the normal direction of the display panel, and wherein the fixture portion includes a plurality of portions that are disposed at intervals along a peripheral direction.

* * * * *